US012078986B2

(12) United States Patent
Murai et al.

(10) Patent No.: US 12,078,986 B2
(45) Date of Patent: Sep. 3, 2024

(54) PREDICTION METHOD AND SYSTEM FOR MULTIVARIATE TIME SERIES DATA IN MANUFACTURING SYSTEMS

(71) Applicant: Accenture Global Solutions Limited, Dublin (IE)

(72) Inventors: Makoto Murai, Tokyo (JP); Shin Moriga, Tokyo (JP); Atsushi Suyama, Tokyo (JP); Motoaki Hayashi, Tokyo (JP); Takuya Kudo, Kirkland, WA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 18/177,871

(22) Filed: Mar. 3, 2023

(65) Prior Publication Data

US 2023/0205192 A1    Jun. 29, 2023

Related U.S. Application Data

(63) Continuation of application No. 17/229,306, filed on Apr. 13, 2021, now Pat. No. 11,619,932.

(51) Int. Cl.
*G05B 23/02* (2006.01)
(52) U.S. Cl.
CPC ....... *G05B 23/024* (2013.01); *G05B 23/0232* (2013.01); *G05B 23/0237* (2013.01)
(58) Field of Classification Search
CPC .............. G05B 13/048; G05B 23/0232; G05B 23/0237; G05B 23/024
See application file for complete search history.

(56) References Cited

U.S. PATENT DOCUMENTS

2016/0350671 A1* 12/2016 Morris, II .......... G05B 23/0229
2020/0082245 A1*  3/2020 Hao ........................ G06N 3/04
(Continued)

FOREIGN PATENT DOCUMENTS

EP          3696622        8/2020
JP       2023-551390 A  * 12/2023  ............... G06F 11/34
WO    WO-2020146708 A1 *  7/2020  .......... G01N 21/8851

OTHER PUBLICATIONS

English Machine Translation of JP-2023-551390-A (Year: 2023).*
(Continued)

*Primary Examiner* — Mi'schita' Henson

(57) ABSTRACT

The present disclosure describes a method of controlling a manufacturing system using multivariate time series and includes storing recording data as a plurality of time series, each time series having a first recorded value and a final recorded value, interpolating, within a first time window, missing values in the plurality of time series using a Bayesian model, the missing values falling between a first and an end time of the respective time series, storing the interpolated values as prediction data, each interpolated value including an uncertainty, loading recorded data of a second time window, loading prediction data of the second time window, predicting, using the Bayesian model, values for each time series that is absent recorded data and prediction data, storing the predicted values, each prediction value including an uncertainty, and adjusting a device that generates the recorded data based on the prediction values within the second time window.

20 Claims, 12 Drawing Sheets

(56) References Cited

U.S. PATENT DOCUMENTS

| | | | | |
|---|---|---|---|---|
| 2020/0192325 A1* | 6/2020 | Sadeghi | ............. | G05B 19/4065 |
| 2020/0226742 A1* | 7/2020 | Sawlani | ............ | H01L 21/67288 |
| 2023/0400847 A1* | 12/2023 | Guo | ................... | G05B 23/0283 |
| 2024/0045411 A1* | 2/2024 | Feng | .................. | G05B 23/0254 |

OTHER PUBLICATIONS

EP Extended Search Report in European Appln. No. 22166599.5, dated Aug. 23, 2022, 4 pages.
Hongfei Wang et al., Exploring Graphical Models with Bayesian Learning and MCMC for Failure Diagnosis, 2020 IEEE, pp. 151-156 (Year: 2020).
Sathyan Munirathinam et al., Big Data Predictive Analytics for Proactive Semiconductor Equipment Maintenance, 2014 IEEE International Conference on Big Data, pp. 893-902 (Year: 2014).

* cited by examiner

PREDICTION METHOD AND SYSTEM FOR MULTIVARIATE TIME SERIES DATA IN MANUFACTURING SYSTEMS

CROSS-REFERENCE TO RELATED APPLICATION

This application is a continuation of U.S. patent application Ser. No. 17/229,306, entitled "Prediction Method And System For Multivariate Time Series Data In Manufacturing Systems," filed Apr. 13, 2021, which is incorporated herein by reference in its entirety.

BACKGROUND

Time series are sequences of time-ordered data points. In a manufacturing setting, a time series can represent the internal state of manufacturing equipment over time. Alternatively, time series can track a particular parameter or characteristic across a sequence of workpieces. For example, a particular physical measurement can be recorded for several workpieces to form a time series that records the measurement over time. Some time series are multivariate, meaning that the time series has more than one time-dependent variable. In multivariate time series, a variable depends on its own past values and at least in part on other variables. For example, a particular manufacturing parameter can depend on both its own past values as well as parameters from upstream manufacturing process steps.

SUMMARY

Implementations of the present disclosure are generally directed to a method of controlling a manufacturing system using multivariate time series. More particularly, implementations of the present disclosure are directed to a method and a system that predict multivariate time series data in a manufacturing system and use the predicted time series data to make adjustments to parameters in the manufacturing system.

In some implementations, actions include recording data from one or more devices in the manufacturing system; storing the recorded data in a data storage as a plurality of time series, wherein each time series has a first recorded value corresponding to a first time and a final recorded value corresponding to an end of the time series; interpolating, within a first time window, missing values in the plurality of time series using a Bayesian model, wherein the missing values fall between the first and end time of the respective time series; storing the interpolated values as prediction data in a prediction storage, wherein the interpolated values include the uncertainty of each interpolated value; loading the recorded data that fall within a second time window from the data storage; loading prediction data from the prediction storage that fall within the second time window and for which no recorded data are available; optimizing the parameters of the Bayesian model using the loaded recorded data and the prediction data; predicting, using the Bayesian model, values for each of the time series for which loaded recorded and prediction data are not available; storing the predicted values as prediction data in the prediction storage, wherein the prediction values include the uncertainty of each prediction value; and adjusting one or more of the devices that generate the recorded data based on the prediction data within the second time window. Other implementations of this aspect include corresponding systems, apparatus, and computer programs, configured to perform the actions of the methods, encoded on computer storage devices.

These and other implementations can each optionally include one or more of the following features: In some implementations, the prediction data are stored as statistical distributions or density functions. In some implementations, the prediction data are stored as stochastic samples, and loading the prediction data includes selecting a random sample of the stochastic samples. Some implementations comprise, if the marginal likelihood of the loaded recorded and prediction data is tractable, computing the marginal likelihood of the loaded recorded and prediction data; and if the marginal likelihood of the loaded recorded and prediction data is not tractable, computing the conditional density of the loaded recorded and prediction data. Some implementations comprise computing a conditional probability $P(x_i|X_{j\neq i})$ for each of the loaded recorded data points within the second time window. Some implementations comprise computing a cost function that includes the conditional density and the computational cost over a range of parameter values; and adjusting the parameter to correspond to a minimum of the cost function. In some implementations, adjusting the one or more devices includes performing or scheduling maintenance of the one or more devices. In some implementations, adjusting the one or more devices includes adjusting operational settings of the one or more devices.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to a method of controlling a manufacturing system using multivariate time series. More particularly, implementations of the present disclosure are directed to a method and a system that predict multivariate time series data in a manufacturing system and use the predicted time series data to make adjustments to parameters in the manufacturing system.

In some implementations, actions include recording data from one or more devices in the manufacturing system; storing the recorded data in a data storage as a plurality of time series, wherein each time series has a first recorded value corresponding to a first time and a final recorded value corresponding to an end of the time series; interpolating, within a first time window, missing values in the plurality of time series using a Bayesian model, wherein the missing values fall between the first and end time of the respective time series; storing the interpolated values as prediction data in a prediction storage, wherein the interpolated values include the uncertainty of each interpolated value; loading the recorded data that fall within a second time window from the data storage; loading prediction data from the prediction storage that fall within the second time window and for which no recorded data are available; optimizing the parameters of the Bayesian model using the loaded recorded data and the prediction data; predicting, using the Bayesian model, values for each of the time series for which loaded recorded and prediction data are not available; storing the predicted values as prediction data in the prediction storage, wherein the prediction values include the uncertainty of each prediction value; and adjusting one or more of the devices that generate the recorded data based on the prediction data within the second time window. Other implementations of this aspect include corresponding systems, apparatus, and computer programs, configured to perform the actions of the methods, encoded on computer storage devices.

Implementations of the present disclosure are described in further detail herein with reference to an example manufacturing system. The example manufacturing system is used to process wafers that are used to fabricate semiconductor devices. A semiconductor device fabrication process is used to manufacture stand-alone semiconductor devices and integrated circuit chips, for example. The fabrication process includes a sequence of automated steps that gradually form electronic circuits on a semiconductor wafer. Due to the number of steps, the fabrication process can take several weeks from start to finish. It is contemplated, however, that implementations of the present disclosure can be realized with any appropriate automated system.

Figure 1:
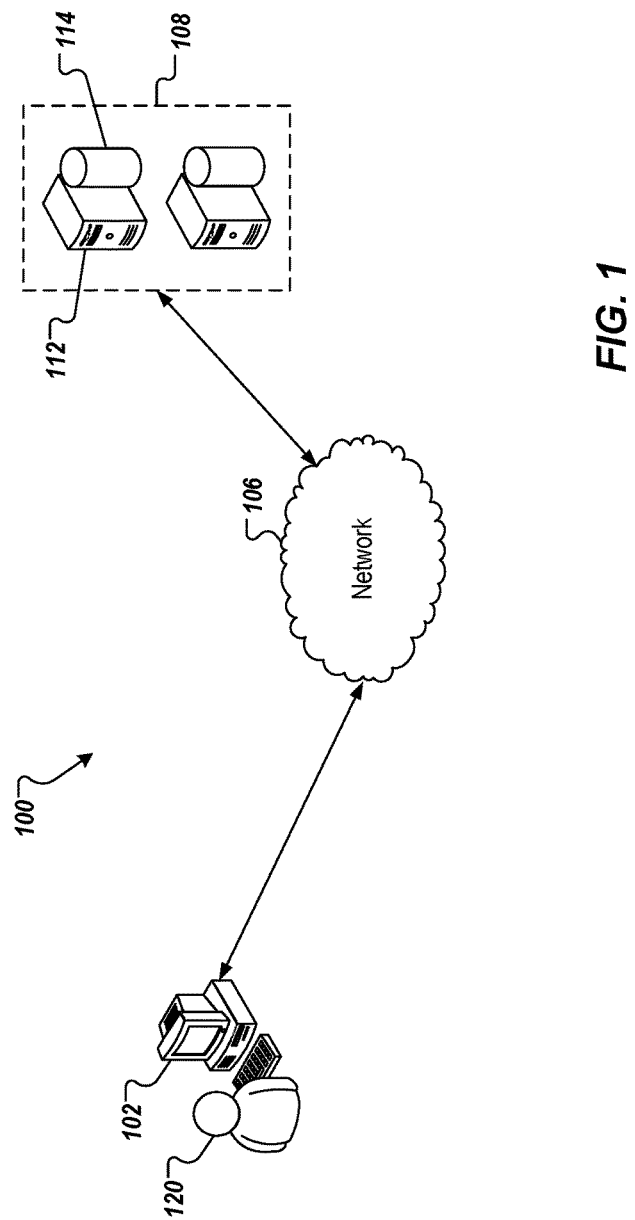
FIG. 1 depicts an example system that can execute implementations of the present disclosure.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host one or more applications that are provided as part of prediction system for multivariate time series in accordance with implementations of the present disclosure.

In some examples, the back-end system 108 hosts an anomaly detection system that detects anomalies in a manufacturing system in accordance with implementations of the present disclosure. For example, a user 120 (e.g., an operator in a semiconductor fabrication plant) can interact with the prediction system using the computing device 102.

Figure 2:
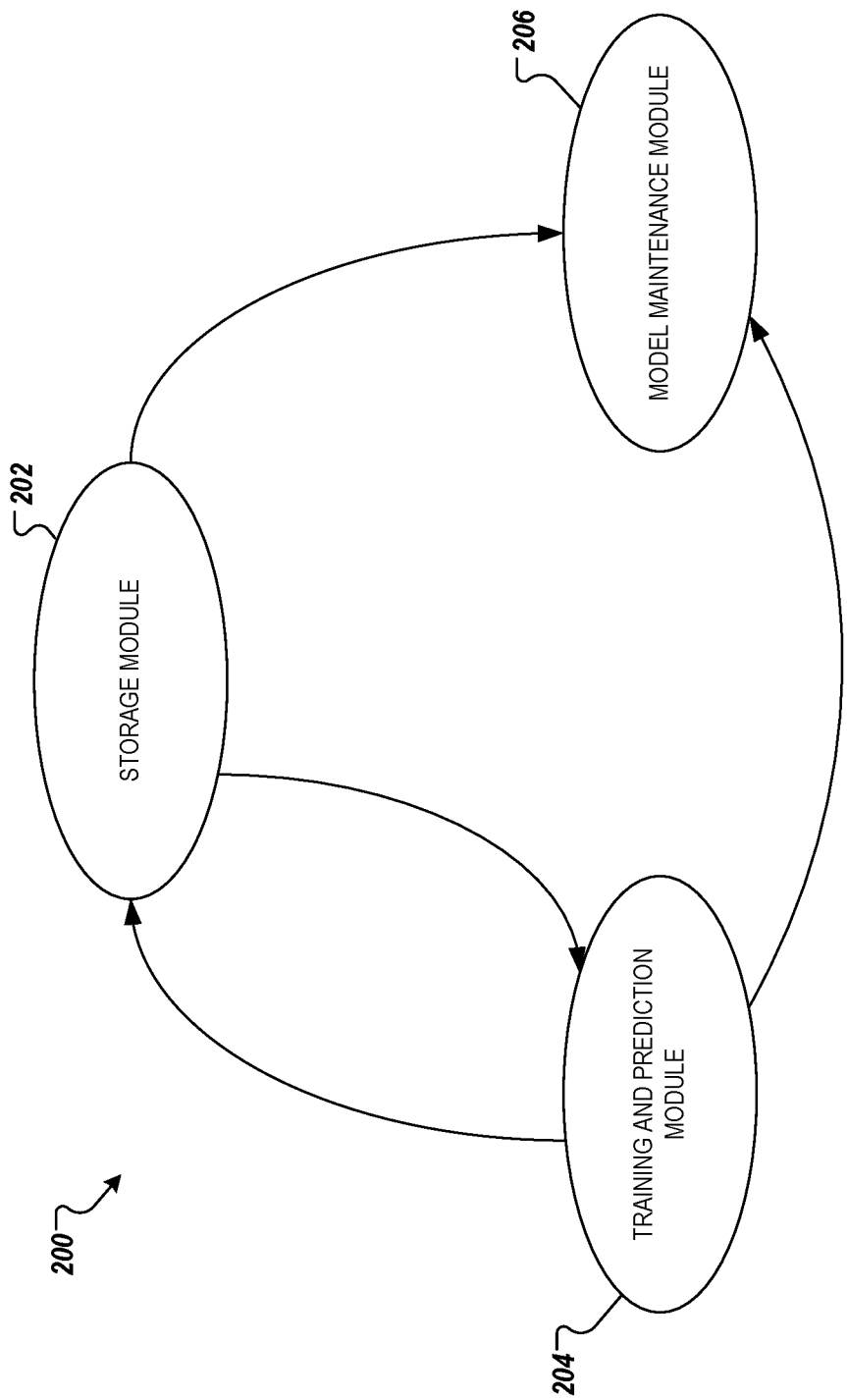
FIG. 2 depicts an example prediction system for multivariate time series data according to the present disclosure.

FIG. 2 depicts an example prediction system 200 for multivariate time series data. The system 200 includes a storage module 202, a training and prediction module 204, and a model maintenance module 206. The storage module 202 includes data storage for time series data recorded from a manufacturing system (not shown) and prediction storage for data predicted by the training and production module 204. In the following disclosure, "recorded data" refers to time series data that is obtained from a manufacturing system. Recorded data can be generated by sensors in the manufacturing equipment. Recorded data can correspond to the internal state of the manufacturing equipment itself or a characteristic or parameter of the workpiece processed by the manufacturing equipment. The storage module 202 accepts requests for data from the training and prediction module 202 and the model maintenance module 206, as shown by the incoming arrows. As shown by the outgoing arrows, the storage module 202 provides recorded data and prediction data to the training and prediction module 202 and the model maintenance module 206. The training and prediction module 204 continuously optimizes model parameters to generate prediction data based on the most recent data from the storage module 202. The prediction results from the training and production module 204 are stored in the storage module 202 for use in subsequent predictions. The model maintenance module 206 evaluates the prediction performance of the training and prediction module 204 based on the most recent data from the storage module 202. The model maintenance module 206 can also identify bottlenecks where prediction data based on the current data are difficult to accurately predict. The operation of the modules 202, 204, 206 is described hereinafter in reference to several examples.

Figure 3:
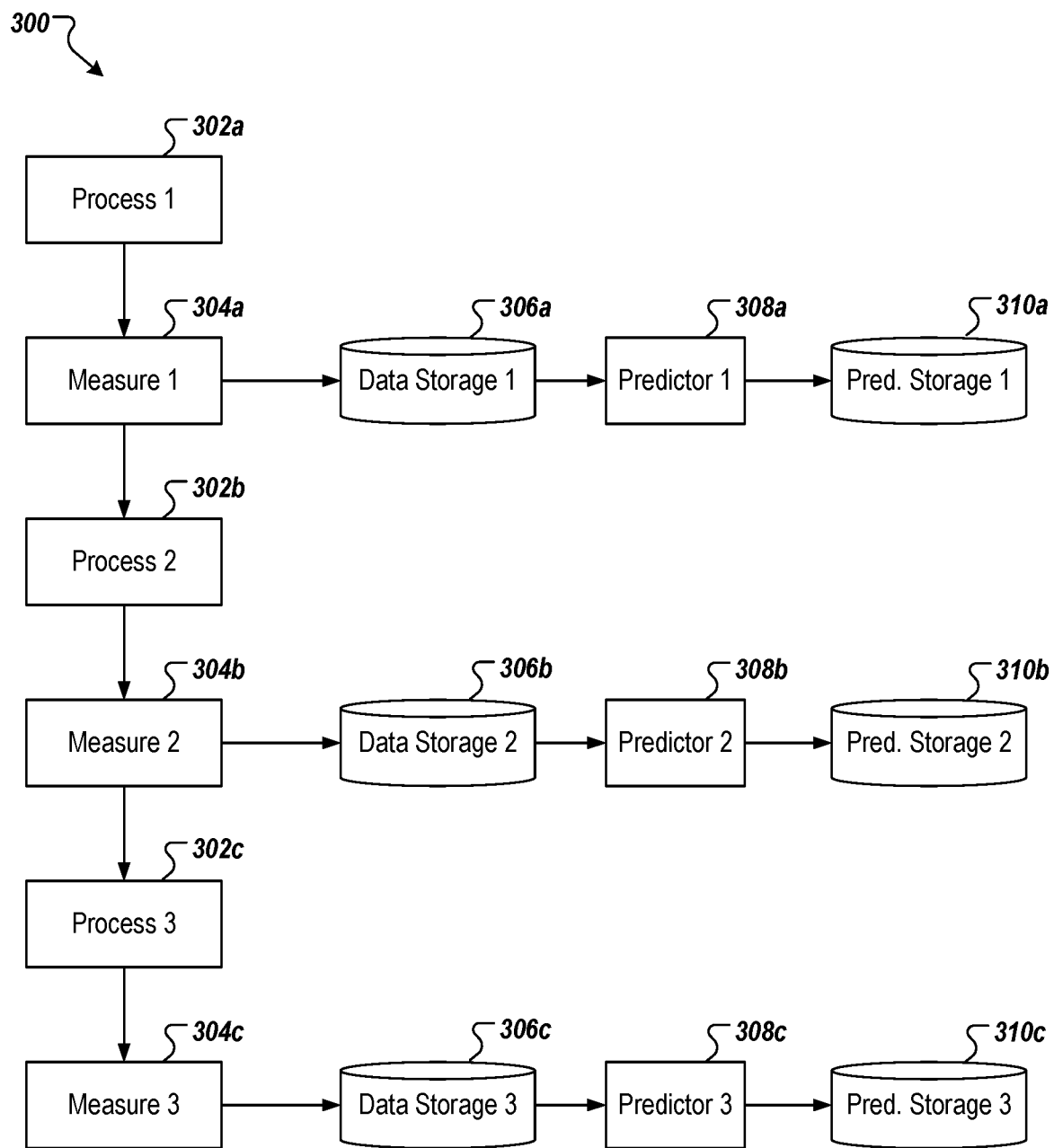
FIG. 3 depicts an example manufacturing system that incorporates a prediction system according to the present disclosure.

FIG. 3 depicts an example manufacturing system 300 that includes a sequence of manufacturing steps 302a-304c. The manufacturing steps 302a-304c generally fall into two categories. The first category includes processing steps 302a-c that alter a workpiece (e.g., a wafer) that is being manufactured. The second category includes measuring steps 304a-c that measure the result of one of the processing steps 302a-c. For example, a measuring step can record a measurement (e.g., a dimension of the workpiece or a physical property) that was altered during an earlier processing step. The system includes the same number of processing and measuring steps 302a-304c that are arranged in alternating order. However, this is not necessarily the case. Other systems can include more than one processing step between two measuring steps. For the sake of simplicity, the system 300 is shown with three processing steps 302a-c. However, the implementations of the present disclosure can also be applied to complex manufacturing systems that include a greater number of processing and measuring steps.

Each measuring step 304a-c is connected to corresponding data storage 306a-c that stores the values obtained in the measuring step 304a-c as a time series. The data storage 306a-c for each measuring step 304a-c is connected to a predictor 308a-c that augments missing data from the time series stored in data storage 306a-c as explained hereinafter in more detail. Each predictor 308a-c is connected to corresponding prediction storage 310a-c for storing the values generated by the predictor 308a-c. FIG. 3 depicts the data storage 306a-c, the predictors 308a-c, and the prediction storage 310a-c as separate entities to show the relationship to the respective measuring steps 304a-c. However, in some implementations, the data storage 306a-c and the prediction storage 310a-c are all included in the storage module 202 of FIG. 2, and the predictors 308a-c are all part of the training and prediction module 204 of FIG. 2. For example, the data storage 306a-c and the prediction storage 310a-c can all be stored on one or more servers 114 in the back-end system 108 of FIG. 1.

Figure 4:
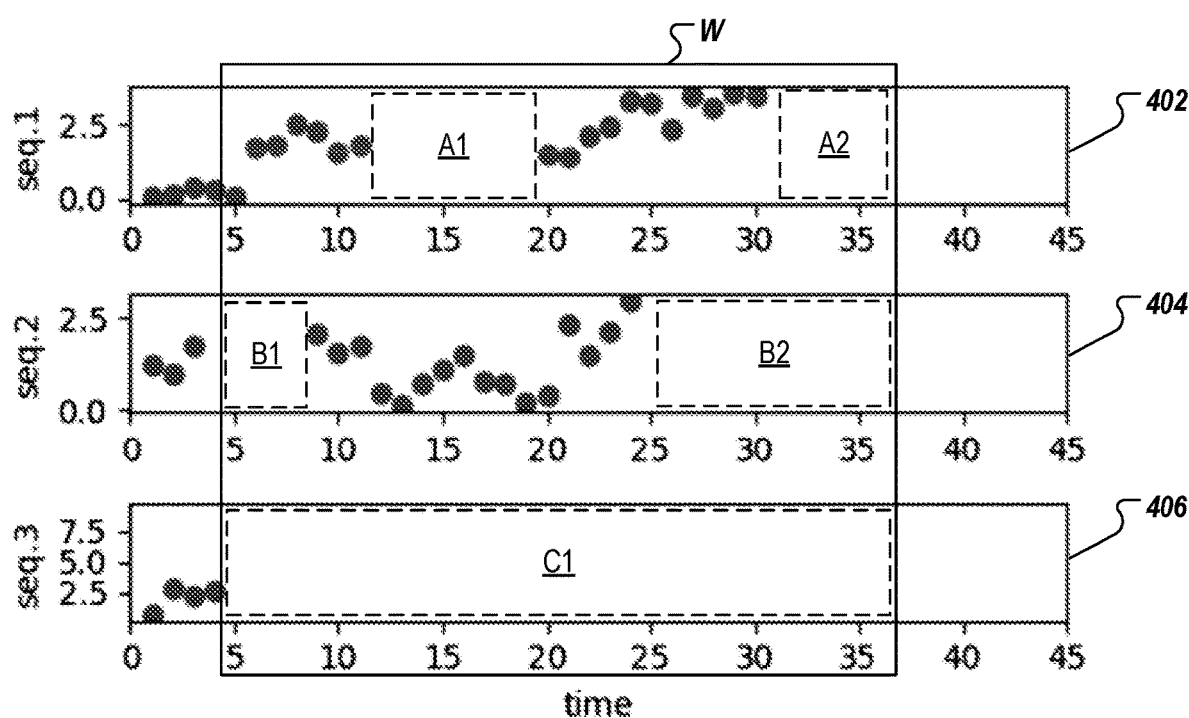
FIG. 4 is a schematic representation of three time series at an initial point in time.

FIG. 4 is a schematic representation of three time series 402, 404, 406 at an initial point in time. For example, the time series 402, 404, 406 include recorded data that are obtained from the measuring steps 304a c in FIG. 3. Each time series 402, 404, 406 includes a plurality of discrete data points that are stored, e.g., in the respective data storage 306a-c for each measuring step 304a-c. Although each time series 402, 404, 406 includes several recorded data points, the time series 402, 404, 406 also include gaps A1, A2, B1, B2, C1 that are defined relative to a window W that covers a particular timeframe (e.g., t=5 to 37). As described in reference to FIGS. 6A and 6B, the window W can change in size or position to cover a different timeframe within the time series data. In some cases, gaps in the time series 402, 404, 406 are attributed to equipment or communication outages. For gaps A1, B1, data points are available both before and after the gaps A1, B1. For example, a sensor may have failed to obtain a measurement, or a sensor may have obtained measurements that were not saved to data storage 306a, 306b due to disruptions in the communication system.

In manufacturing applications, data are obtained from the measuring steps 304a-c as workpieces pass through the respective measuring step 304a-c. The first workpiece in a lot may have already cleared all three measuring steps 304a-c, and data corresponding to the first workpiece is available in all three time series 402, 404, 406. In contrast, a second workpiece may have only cleared the first measuring step 304a at the point in time under consideration. In this case, the time series 404, 406 do not yet include data that correspond to the second workpiece. In other words, data acquisition may be asynchronous. For example, the gaps A2, B2, C1 in FIG. 4 may be attributed to asynchronous data acquisition.

The predictors 308a-308c use Bayesian statistics to impute the missing values for the gaps A1, A2, B1, B2, C1 in the time series 402, 404, 406. When the system 300 is initialized, the prediction storage 310a-c does not have previous predictions for the values in the gaps A1, A2, B1, B2, C1. In this case, the predictors 308a-308c initially use historical data and the data available in data storage 306a-c to interpolate the missing values for gaps A1 and B1, which are between the first and final data point in each time series. The gaps A2, B2, C1 that follow the final value of the time series are predicted using the same model. For example, the missing values for gaps A1 and B1 can be interpolated by calculating the posterior distribution p(x|y), where x is a set of missing values and y is a set of observed values. This approach requires a probabilistic time-series model, such as state space model for the system, but does not require a special algorithm for interpolating the missing values.

The predictors 308a-308c or the training and prediction module 204 impute missing data using only a single model for the lagged data. In other words, the predictors 308a-308c do not require a dedicated method for interpolating missing values in the time series. A single model (e.g., a state space model) represents the time series data and can be used both for prediction and to interpolate missing values. Since all time series models can be mathematically interpreted as a Bayesian model, all time series models can be used to interpolate missing values and represent uncertainty. The training and prediction module can use any time series prediction model, such as Gaussian process models, state space models, ARIMA models, recurrent neural network models, and their variants. The missing values are stored as prediction values in prediction storage 310a-310c along with their uncertainty values. The prediction values can be stored as statistics, as a density function, or as stochastic samples.

Figure 5:
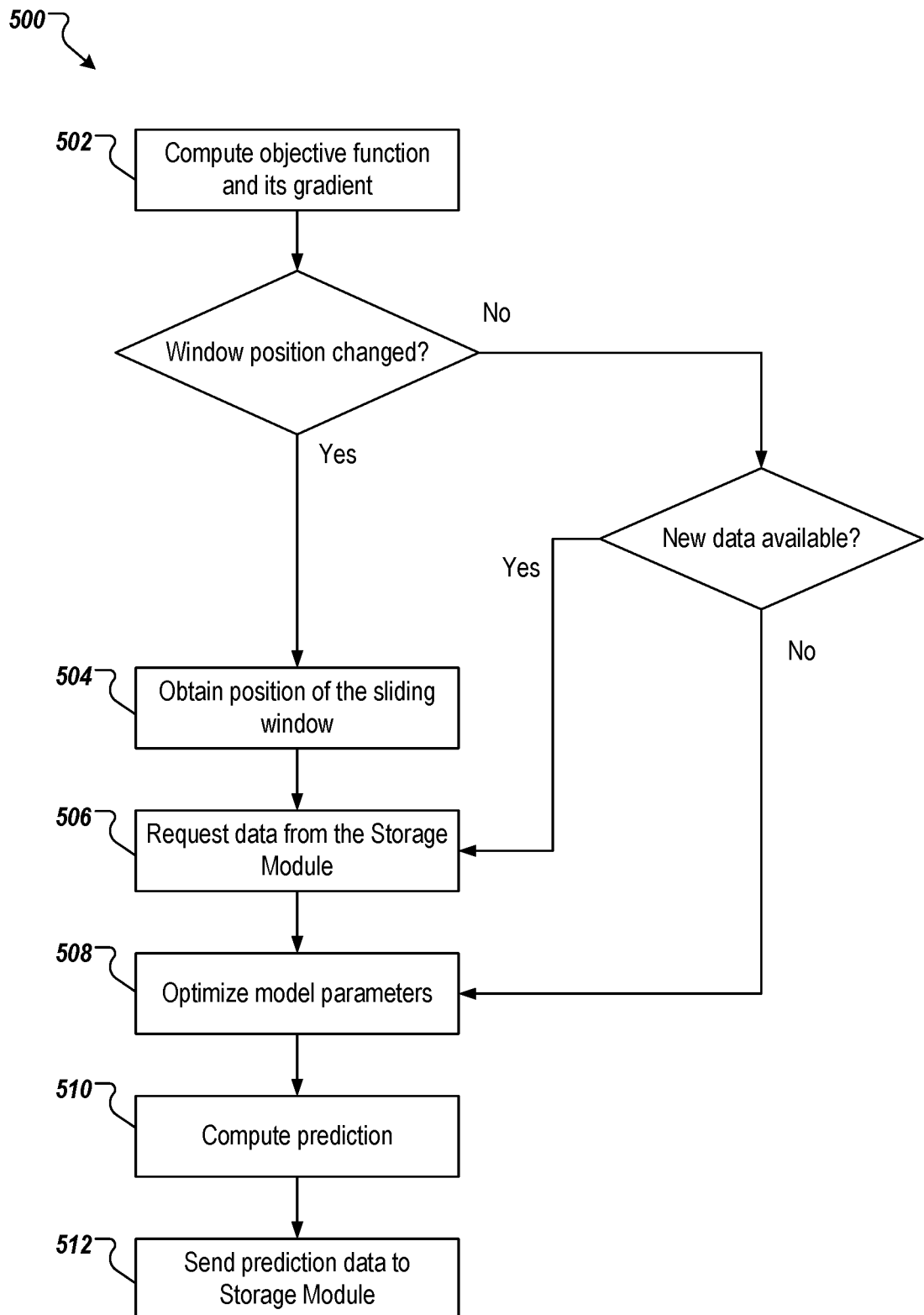
FIG. 5 depicts an example process that can be executed by the training and prediction module of FIG. 2.

FIG. 5 depicts an example process 500 that can be executed by the training and prediction module 204 of FIG. 2 and the predictors 308a-c in FIG. 3. At 502, the training and prediction module 204 calculates the objective function and the gradient for the prediction. In process 500, the gradient of the objective function is only calculated at initialization of the system 200 to save time and computational resources. The training and prediction module 204 distinguishes between whether the position of the window W (FIG. 4) relative to the time series has changed. If so, the updated position of the sliding window is obtained at 504, and the position of the window W is used to request data from the storage module 202 at 506. If the position of the window W has not changed, the training and prediction module 204 determines whether new data is available for the window W by sending a request for data to the storage module 202 (not shown). If new data is indeed available, data is requested from the storage module 202 at 506, similarly to when the position of the window has changed. After retrieving the data from the storage module 202, the loaded data is used to optimize model parameters at 508 and compute the prediction at 510, respectively. At 512, the prediction data obtained at 510 is sent to the storage module 202 for storage in prediction storage.

Generally speaking, any suitable optimization method can be applied. According to the principles of Bayesian statistics, algorithms such as Markov chain Monte Carlo (MCMC) and variational inference calculate the model parameters can be used, for example. Markov chain Monte Carlo methods use random samples to approximate the posterior distribution of a parameter that cannot be calculated directly. For example, the method begins with a plausible starting value for the parameter. A new proposal is generated by adding random noise generated from a proposal distribution to the plausible starting value. The posterior distribution is calculated for both the plausible starting value and the new proposal. If the new proposal results in a higher posterior value, the starting value is discarded for the new proposal. If the new proposal results in a lower value, a probability equal to the height of both posterior values is used to determine whether the new proposal is accepted or rejected. In either case, if the new proposal is accepted, the new proposal becomes the starting point, and the process is repeated. If the new proposal is rejected, the process is restarted with the earlier starting point. By repeating this process, the MCMC method can generate a distribution of samples that is close to the actual distribution of the parameter using a relatively small number of samples.

Computing the prediction also follows the principles of Bayesian statistics and uses the distribution of the learned model parameters to calculate the predictive distribution, for example.

Figure 6A:
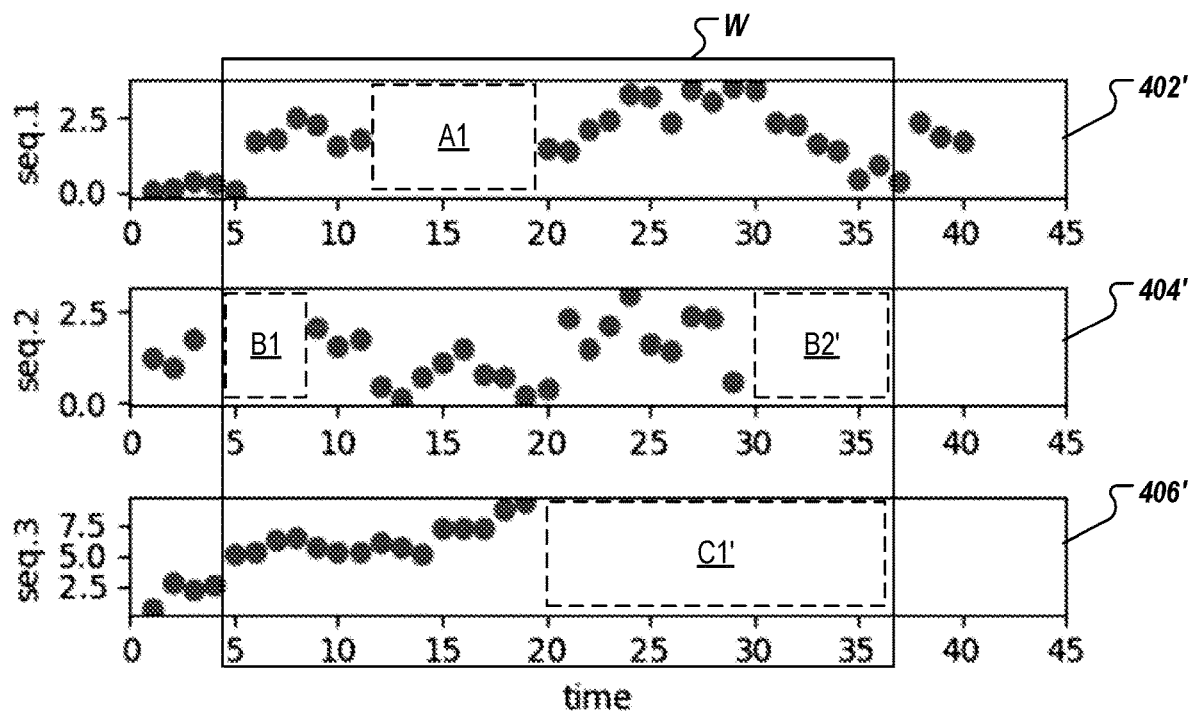
FIGS. 6A and 6B depict the time series of FIG. 4 at a later point in time.
Figure 6B:
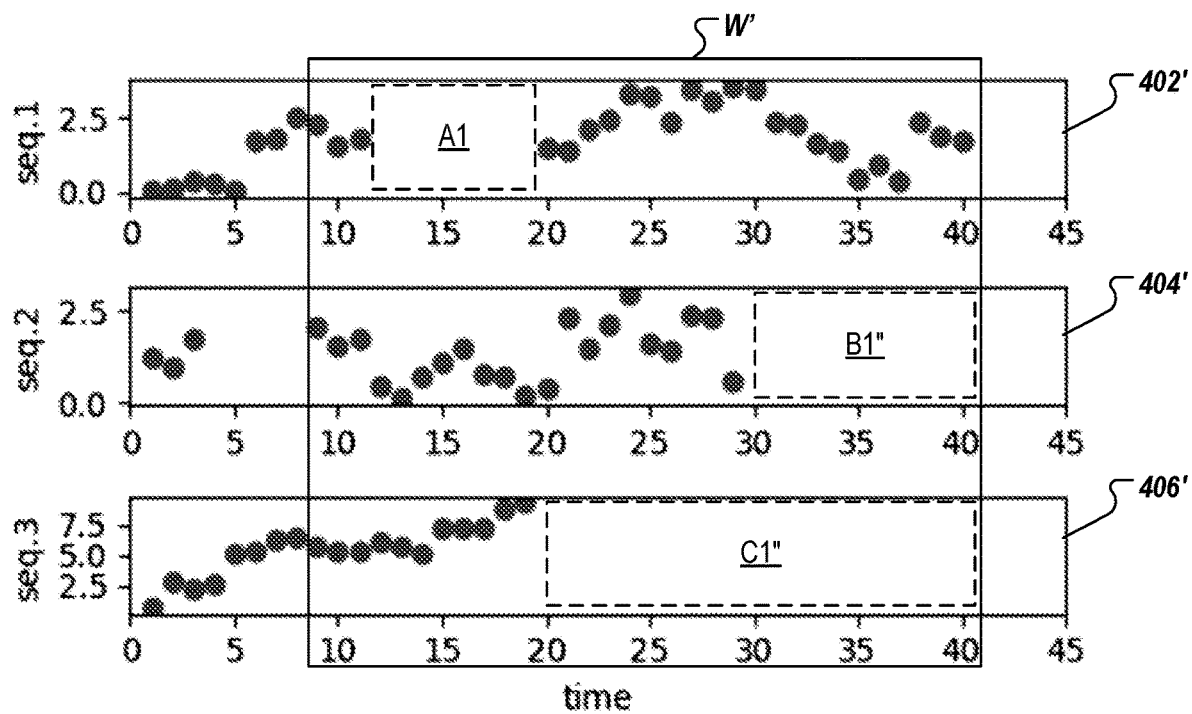

FIGS. 6A and 6B depict examples of time series that correspond to the two scenarios indicated in FIG. 5. The same reference numerals are used as in FIG. 4 to indicate corresponding elements. Similar elements that have progressed in time are indicated by the use of single and double quotes following the reference numerals.

FIG. 6A depicts the time series 402', 404', 406' after some time has elapsed since the initial time depicted in FIG. 4. However, the position of the window W is the same as in FIG. 4. For example, what was previously gap A2 in time series 402 has been filled with recorded data in time series 402'. Similarly, newly available data in time series 404', 406' has filled part of the gaps B2, C1 in time series 404, 406. However, some gaps A1, B1 remain the same despite the progression of time. For the gaps A1, B1 that have remained the same, the predictions (interpolated values) that were previously saved in prediction storage can be used again to impute the missing data. For the changing gaps B2, C1, the training and prediction module 204 loads the newly added data from the storage module 202 to train the model and generate new prediction values for the gaps B2', C1' in time series 404', 406' (see 506-510 in FIG. 5). Unlike in the initial step, the objective function and its gradient are not calculated again. Instead, the most recent data and prediction results are fed as input to the gradient function for further training and prediction.

FIG. 6B depicts the time series 402', 404', 406' with a shifted window W' at a different position than the window W in FIG. 4. Although the recorded data in the time series 402', 404', 406' is the same as in FIG. 6A, the new position of the window W' changes at least some of the areas of data that need to be imputed. For example, the gap B1 from FIGS. 4 and 6A no longer falls into the new window W', while the gaps B1'', C1'' are larger in size than their counterparts in FIG. 6A. However, some gaps, e.g., gap A1 in time series 402', remain the same. When progressing from FIG. 4 directly to 6B, the process for imputing the missing data similar to what is described for FIG. 6A. When progressing from FIG. 6A to 6B, no new recorded data is available in the time series 402', 404', 406' themselves. Accordingly, the training and prediction module 204 uses the same data to generate further predictions to impute the values for gaps B1'', C1''.

Although the windows W, W' in FIGS. 6A and 6B have the same size, the size of the window can also change from one iteration to the next. In implementations in which the window size is variable, the gradient function can also be variable. In this case, there is no need to recalculate the gradient function. Instead, it is sufficient to additionally compute the gradient function as the window size increases.

Thus, the training and prediction module carries over past training results and augments those results with a small amount of new data. Since training and data loading occur in parallel, the calculation time that is necessary for training for each window position can be reduced. In this way, the computational time required for time series predictions can be reduced. Further, since data is stored at a high-frequency, a well-trained model can quickly produce prediction results using the most recent data.

Figure 7:
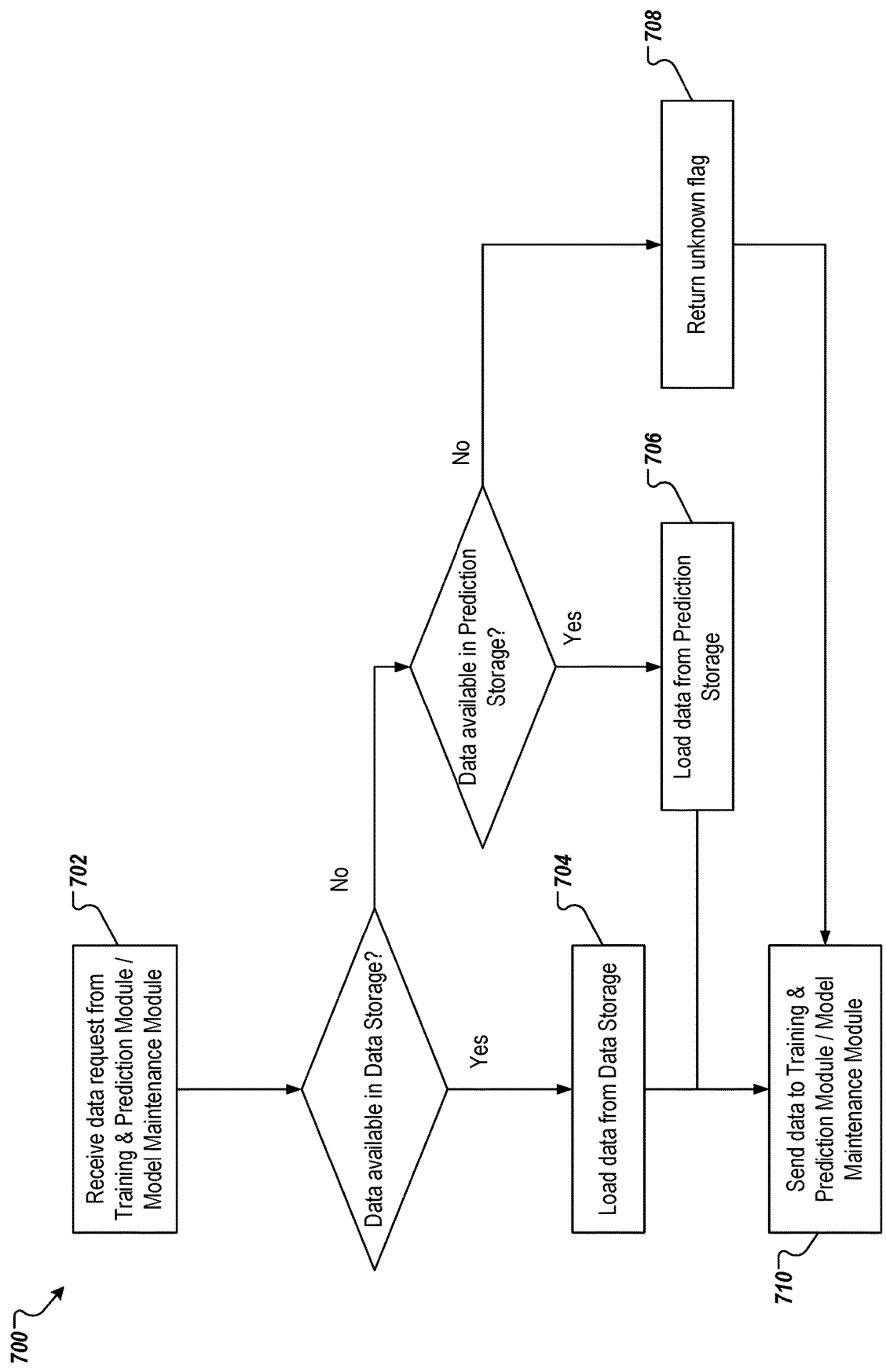
FIG. 7 depicts an example process that can be executed by the storage module of FIG. 2.

FIG. 7 depicts an example process 700 that can be executed by the storage module 202 of FIG. 2. At 702, the storage module 202 receives a data request from the training and prediction module 204 or the model maintenance module 206 (FIG. 2). For example, the request can correspond to 506 of process 500. The storage module 202 initially queries whether the recorded data corresponding to the requested data and window is stored in data storage (e.g., 306a-306c in FIG. 3). If so, the recorded data is loaded from the data storage at 704. In other words, if recorded data is available in the data storage for a value that was previously only predicted, the storage module 202 loads the recorded value instead of the predicted value. If the time series contain gaps after the recorded data has been loaded from data storage, the storage module 202 queries whether values for the missing data are saved in the prediction storage (e.g., 310a-310c in FIG. 3) at 706. Since the prediction storage only contains values that have been previously predicted, a complete set of data and prediction data may not be available for a particular time series after the initialization of the system. The system returns an unknown flag for such unavailable values at 708, which are processed as a predetermined high variance value and used as input to predict another value. Since the storage module 202 loads data from both data storage and prediction storage, the likelihood that the training and prediction module 204 will not be able to run because of missing time series data is reduced.

As previously described, the prediction values can be stored as statistics, as a density function, or as stochastic samples, which allow information about the uncertainty of the prediction values to be preserved. In contrast, point estimation does not include uncertainty information. Some complex predictive distributions are unable to be represented by a single density function or a small number of statistics. If the distribution is too complex, stochastic samples with an increased sample size or a richer representation method such as mixture of densities can also be used. In order to reduce the data size of the predictive distributions, stochastic samples may be used as the representation method for the prediction values, and one sample may be selected at random to be loaded.

Figures 8A, 8B:
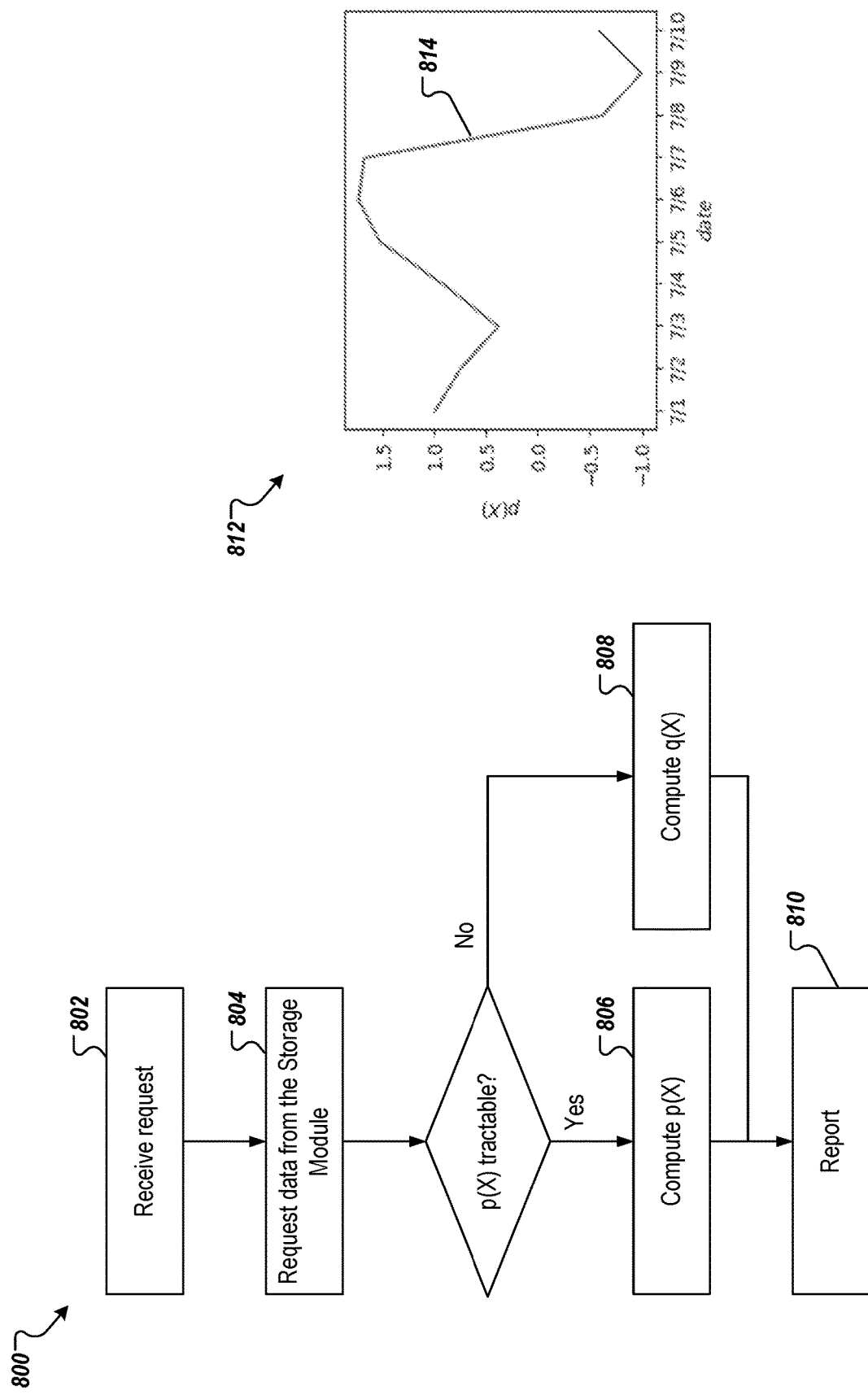
FIGS. 8A, 9A, and 10A depict example processes that can be executed by the model maintenance module of FIG. 2.
FIGS. 8B, 9B, and 10B depict example graphical representations of reports generated in FIGS. 8A, 9A, and 10A.
Figures 9A, 9B:
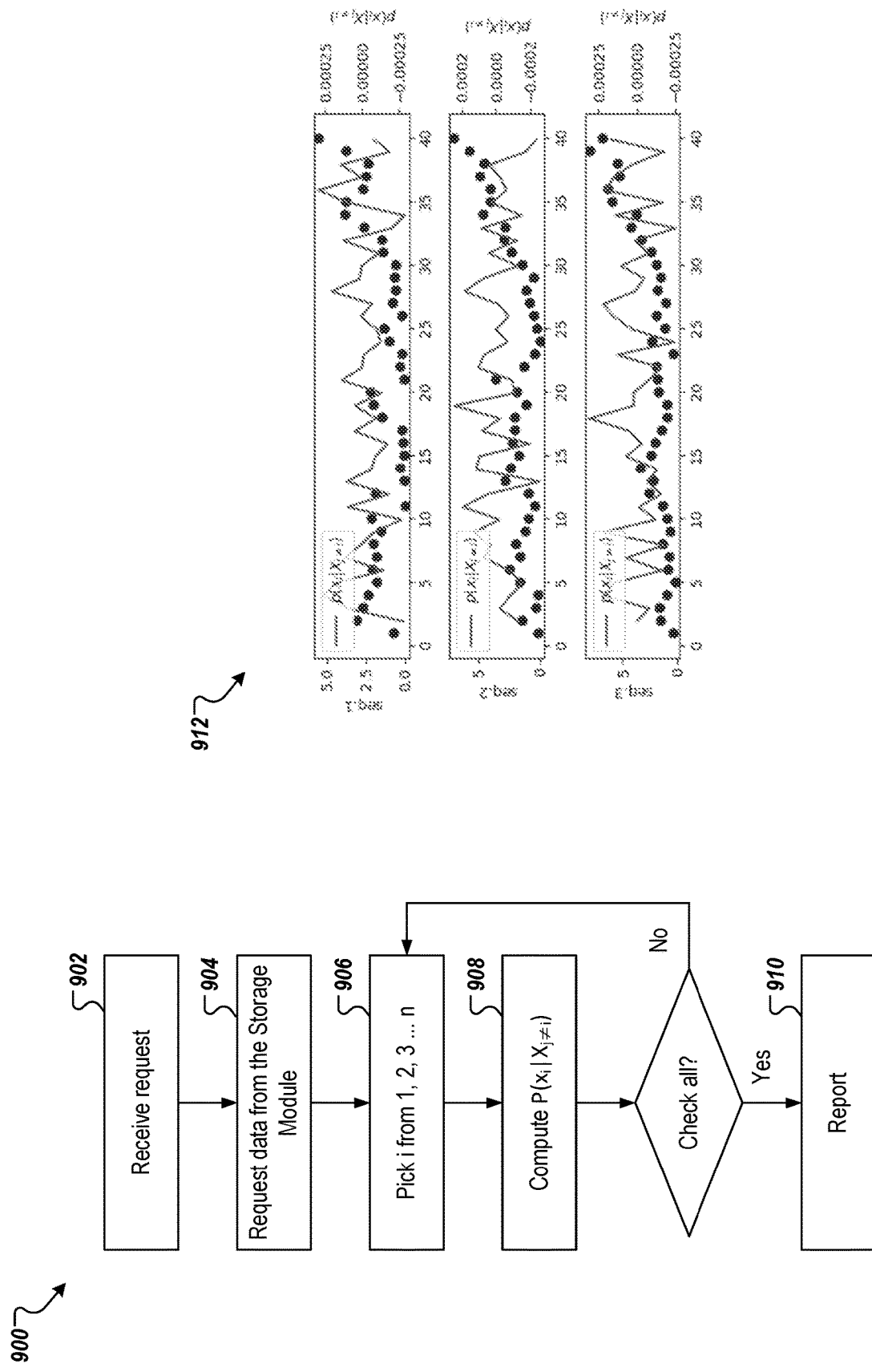
Figures 10A, 10B:
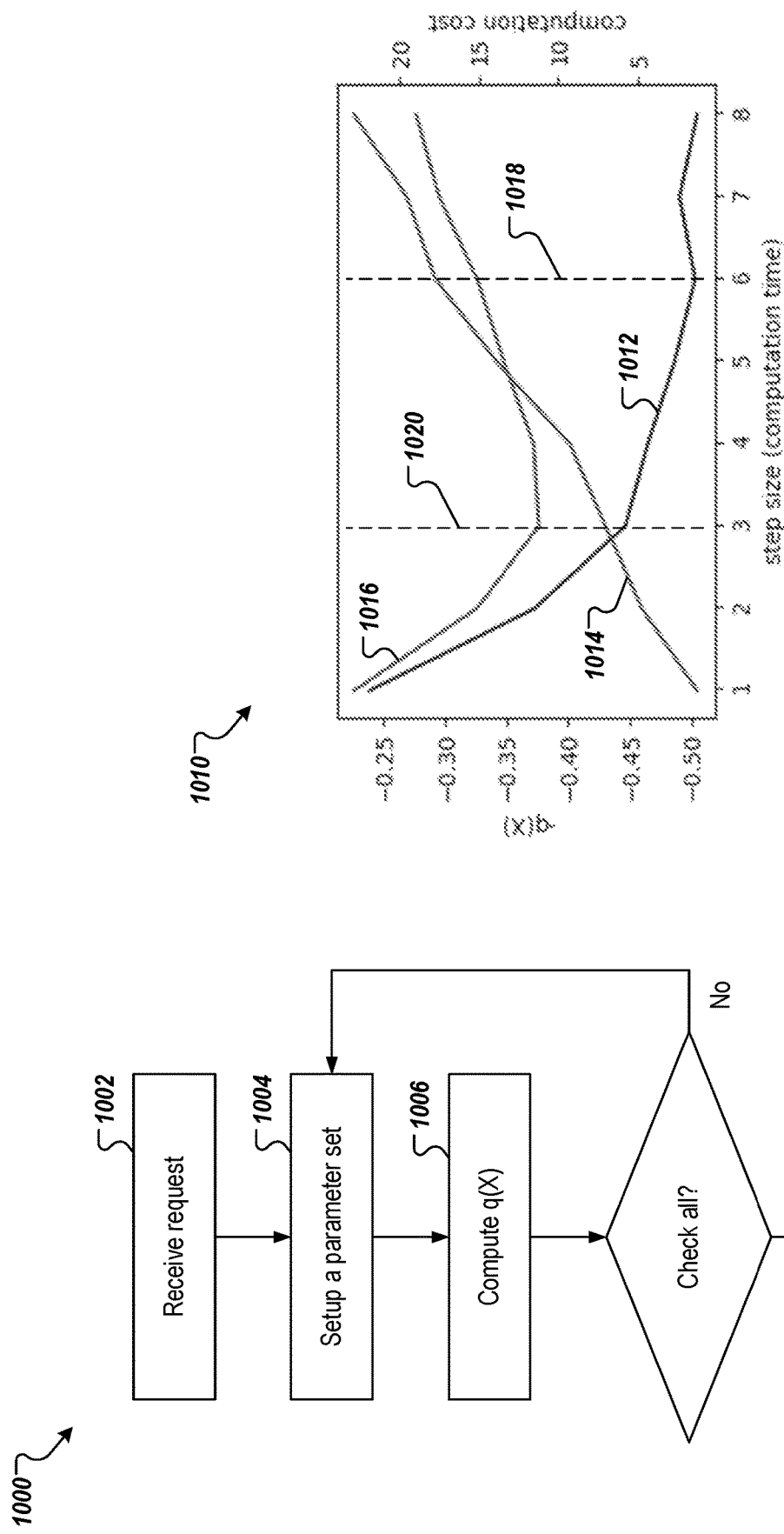

FIGS. 8A, 9A, and 10A depict example processes that can be executed by the model maintenance module 206 of FIG. 2 to continuously evaluate the prediction performance based on the latest data and training results.

FIG. 8A depicts an example process 800 for evaluating the performance of the current prediction model used by the training and prediction module 204. At 802, the model maintenance module 206 receives a request for evaluation. The request can be triggered by the user (e.g., user 102 in FIG. 1), or the system can trigger the request according to a pre-determined schedule. In both cases, the model maintenance module 206 operates in parallel to the training and prediction module 204. At 804, the most recent available data is loaded from the storage module 202. The most recent available data includes all of the data available in data storage for the particular window W augmented by values stored in prediction storage. Based on the loaded data, the model maintenance module 206 determines whether the marginal likelihood p(X) is for the loaded data is tractable. If so, the marginal likelihood p(X) is computed at 806. If not, the conditional density q(X) is calculated at 808. In both cases, a report is returned at 810. In many cases, it is difficult to quantitatively assess the predictive accuracy of multiple time series, since each time series has a different scale. By using the marginal likelihood to evaluate the prediction performance, such differences in scale can be naturally resolved.

FIG. 8B is an example graphical representation 812 of the report generated at 810. The graph 812 shows the marginal likelihood p(X) 814 over a period of nine days. In the final three days of the nine-day period, the marginal likelihood p(X) drops significantly, which indicates that the performance of the model degrades in that timespan. In response, the user can modify the model or tune the hyperparameters as necessary. An automatic performance tuning mechanism can also tune the hyperparameters based on user input or according to a predetermined schedule.

FIG. 9A depicts an example process 900 that determines the prediction accuracy of specific data points within each time series. At 902, the model maintenance module 206 receives a request similarly to in process 800. At 904, the model maintenance module 206 loads the most recent available data similarly to in process 800. At 906 and 908, the model maintenance module 206 computes the conditional probability $P(x_i|X_{j\neq i})$ for each of the n points in the data series to determine whether the training and prediction module 204 predicted a value close to the actual data point that was later recorded, i.e., the prediction accuracy. To obtain $P(x_i|X_{j\neq i})$, both observed and unobserved data are taken into account. The unobserved data are stored in the storage module 202 as a distribution. Mathematically, $P(x_i|X_{j\neq i})$ for such values can be calculated by integrating (averaging) the stored distribution. If only the values in a specific window are evaluated, the model maintenance module 206 computes the conditional probability $P(x_i|X_{j\neq i})$ for each of the n points within the window. Once the computations are complete, the model maintenance module 206 generates a report at 910.

FIG. 9B is an example graphical representation 812 of the report generated at 910. The graph 910 includes three time series with the individual data points of the time series marked by circles. The data points are overlaid with a line that represents the conditional probability $P(x_i|X_{j\neq i})$ at each data point. The smaller the value of the conditional probability $P(x_i|X_{j\neq i})$, the lower the accuracy of the prediction generated by the training and prediction module 204. For example, based on the value of the conditional probability $P(x_i|X_{j\neq i})$, the model maintenance module 206 indicates data points that were difficult to predict. This means that the data points were outliers in the predictive distribution. The user can examine the data and model based on these suggestions. The prediction system 200 itself does not perform operations on the data itself, such as removing the data points with low conditional probability values.

FIG. 10A depicts an example process 1000 that automatically finds parameters (e.g. optimization step size) with the lowest cost. At 1002, the model maintenance module 206 receives a request similarly to in processes 800, 900. At 1004, a parameter set is determined based on the request. For example, if the parameter is the optimization step size, and the parameter set may include a range of different step sizes. At 1006, the conditional density q(X) is calculated for each of the parameters. After q(X) has been calculated for each of the parameters, a report is generated at 1008.

FIG. 10B is an example graphical representation 1010 of the report generated at 1008. The horizontal axis of the graph 1010 includes the parameter set, i.e. the optimization step size. The curve 1012 corresponds to q(X) calculated for each step size at 1006 and represents a decrease in the model's performance. The curve 1014 represents the computational cost, which increases with the step size. The curve 1016 is a total cost function that is based on −q(X) and the computational cost. For example, if the training and prediction module 204 currently uses a step size of 6, indicated by the dotted line 1018, the model maintenance module 206 will recommend a step size of 1020, which corresponds to a minimum of the total cost function 1016. For example, the model maintenance module 206 can display the recommendation to the user. Alternatively or additionally, the training and prediction module 204 can be configured to automatically update one or more parameters based on the model maintenance module's recommendation.

Figure 11:
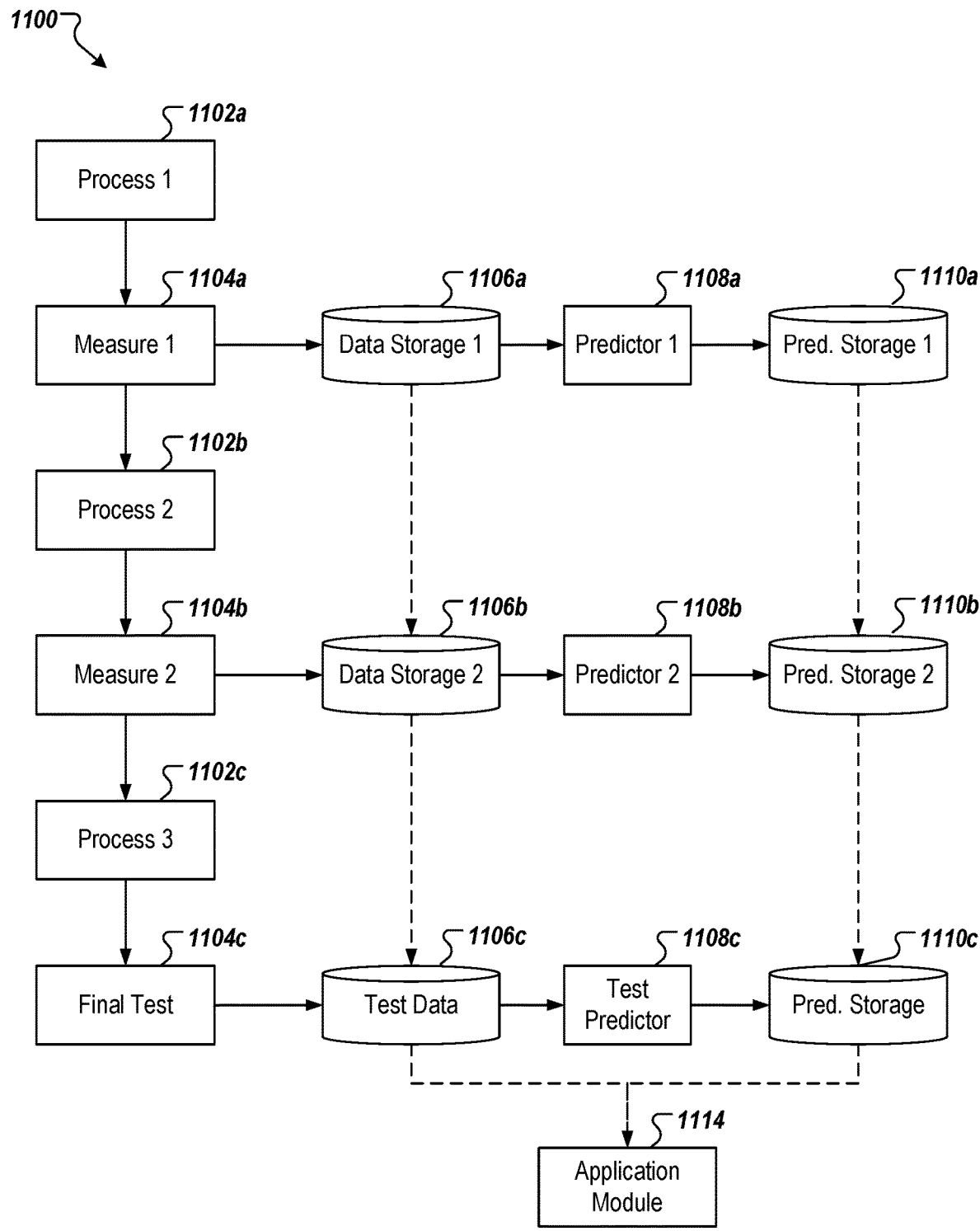
FIGS. 11 and 12 depict further examples of manufacturing systems that incorporate the prediction system of the present disclosure.
Figure 12:
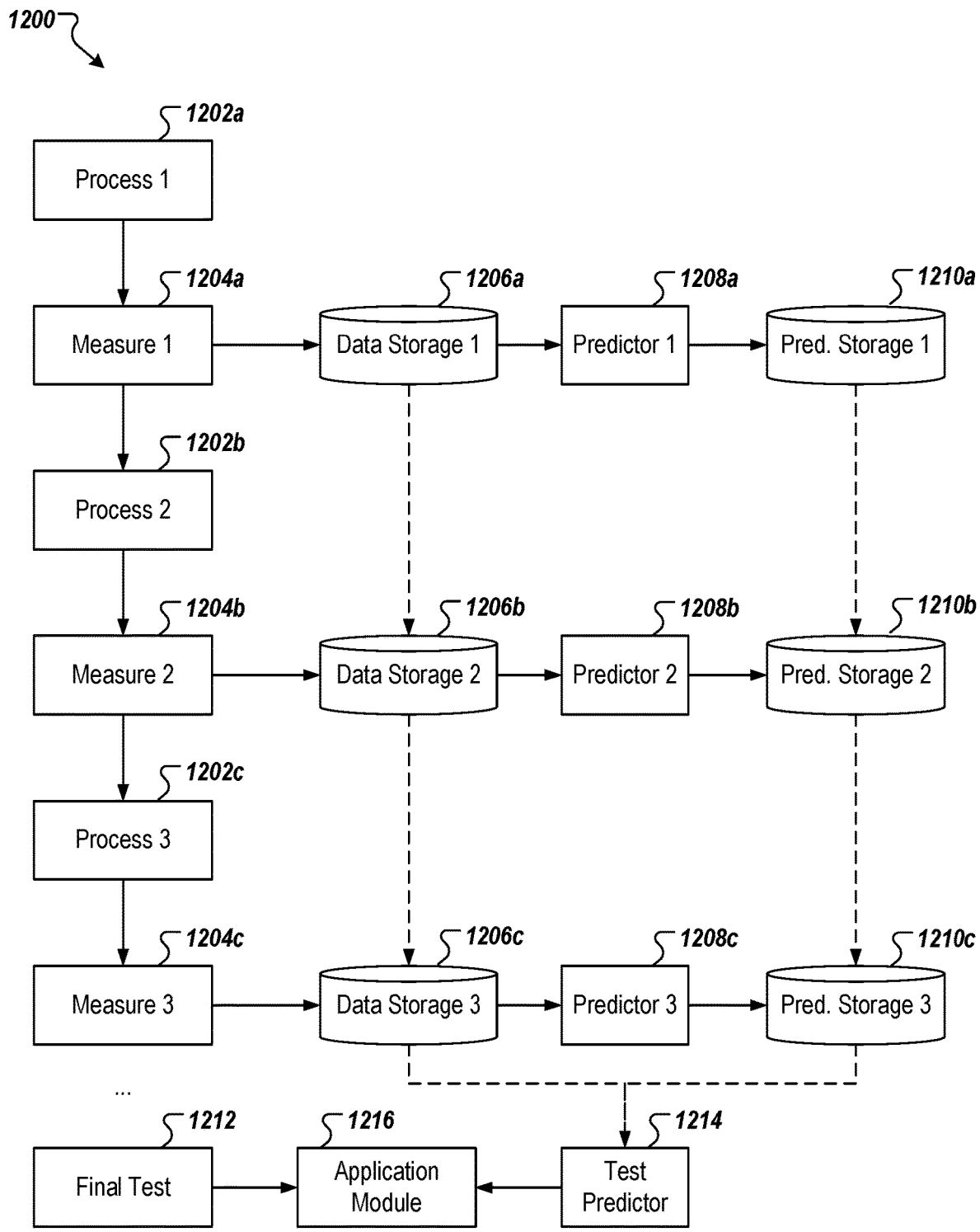

FIGS. 11 and 12 each depict an example of a manufacturing system 1100, 1200 that incorporates the prediction system of the present disclosure. For example, the manufacturing systems 1100, 1200 can be used to fabricate semiconductor wafers. Wafer fabrication includes four broad categories of processing steps: deposition, removal, patterning, and the modification of electrical properties. These processing steps are performed at specific areas on the wafer and repeated hundreds of times to form the finished circuit. In addition to the processing steps, wafer fabrication includes measuring steps that are interspersed between the processing steps. The data obtained at each measuring step can be used for in-line quality control. For example, the data can be compared to a predetermined upper and lower limit. If the measured data falls outside of the limits, the wafer can be deemed defective. Wafer fabrication generally ends in a wafer testing step that tests the circuits on the wafer for functional defects according to a sequence of test patterns. After wafer testing, the wafer may continue on to further fabrication steps, such as die preparation.

The data gathered in semiconductor manufacturing have the following characteristics. Sensor and quality control data from multiple processes constitute multivariate data. The internal states of manufacturing equipment varies with time, which lends itself to time series data. Similarly, the state of the wafer itself depends on the processing time. Since the fabrication process is sequential, the availability of the data depends on the progress of the wafer through the sequence, i.e., the data is asynchronous. Finally, quality control data is usually sub-sampled, meaning that not all quality control data is available for every wafer.

In FIGS. 11 and 12, the processing steps are represented by process steps 1102, 1202, and the wafer test is represented by the final test 1104c, 1212. The data from the measuring steps 1104, 1204 can include in-line quality data, as described above, or sensor data that indicates the state of the processing equipment. In the system 1100 of FIG. 11, the data from the final test 1104c is handled in the same manner as the data from the testing steps 1104a, 1104b. In other words, the data from the final test 1104c is handled by the prediction system 200 as one of several time series. The prediction system according to the present disclosure can represent the data from the final test 1104c alongside the time series data from the measuring steps 1104a, 1104b and capture the correlation between the data in the respective time series.

Alternatively, FIG. 12 shows that the time series modeled according to the present disclosure can be input to a separate test predictor 1214 (e.g., a machine learning model) that predicts the results of a separate final test 1212. In this example, an application module 1216 can compare the results of the data measured in the final test 1212 to the data generated by the test predictor 1214.

In both systems 1100, 1200, the application module 1114, 1216 can include one or more of the following additional functions. The application module 1114, 1216 visualize the prediction and provide a quantitative risk assessment. The application module 1114, 1216 can also compare the measured final test data and the predicted final test data to monitor prediction accuracy. The application module 1114, 1216 can also include an alarm management system that alerts a user based on pre-determined scenarios, e.g., if the model accuracy degrades significantly, or if a prediction diverges from a pre-determined limit.

In the context of wafer fabrication and other manufacturing systems, the described techniques can detect anomalies in the manufacturing equipment or manufactured parts at an early stage. For example, anomaly detection can be achieved by using the model maintenance module, which can indicate data points that were difficult to predict. Such data points can be used to detect anomalies. Similarly, the prediction data can be used to predict the maintenance of manufacturing equipment. For example, if equipment output is known to change over time, the future state of the equipment can be inferred using time series prediction. If a major change in the equipment state is predicted, measures such as early maintenance can be taken to return the output parameter to an acceptable range. For example, a given machine may perform an etching or machining operation that is measured after the operation. If the time series prediction indicates that the measurements will fall outside an acceptable range at a given point in time, operating parameters of the machine may be adjusted (e.g., via maintenance measures) before the actual measurements reach an unacceptable point. Finally, the techniques can be used to for virtual metrology, i.e., to replace costly physical measurements of the wafers.

Although several of the previously described implementations relate to manufacturing systems, the techniques described in the present disclosure can also be applied to other contexts.

For example, autonomous robots and vehicles are equipped with multiple types of sensors and control their actuators based on high-frequency sensor data, e.g., in order to avoid collisions with obstacles. With such a large number of sensors, multimodal sensors may have a tendency to receive input data at different times. Further, some of the data may be lost due to communication conditions. In order to monitor the activity of the autonomous robot or vehicle, it is necessary to quantitatively evaluate whether its predictive function is working properly. This may be difficult because each sensor has a different scale and/or frequency. The techniques described in this disclosure can handle delayed data and infer missing data. The parallel processing used in the prediction system allows for quick data acquisition and prediction. The model maintenance module can quantify overall prediction performance and identify individual sensors that generate data that is difficult to handle.

The techniques can also be applied to automated trading. Automated trading requires fast trading speeds and high forecasting accuracy that is based on data from multiple markets. Such systems must handle a large number of transactions in a limited amount of time. The data from different markets is likely to differ in their time granularity. When earnings fall, there is a need to identify the cause in the prediction model. The techniques described in this disclosure can quickly perform predictions for a large amount of data, since computational costs can be reduced. Missing data can be inferred, and unobserved delayed values can be predicted. The model maintenance module can identify the specific markets whose data is difficult to predict and automatically tune the model to improve prediction performance.

In general, the techniques described in the present disclosure provide a consistent framework for handling multivariate time series that include asynchronous and missing values. The use of multivariate time series data from different processes leads to higher predictive performance than analyzing each process independently. The parallel routines of data acquisition, learning, and prediction lead to efficient computation. Finally, the prediction system can accurately monitor and improve the predictive models.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method of controlling a system using multivariate time series, the method comprising:
    storing recorded data in a data storage as a plurality of time series, each time series having a first recorded value corresponding to a first time and a final recorded value corresponding to an end of the time series;
    providing, within a first time window, interpolated values using a Bayesian model, the interpolated values being used for missing values in the plurality of time series;
    storing the interpolated values as prediction data in a prediction storage;
    loading at least a portion of the recorded data from the data storage, the at least a portion of the recorded data being defined using a second time window;
    loading at least a portion of the prediction data from the prediction storage, the at least a portion of the prediction data corresponding to one or more gaps in the second time window;
    predicting, using the Bayesian model, prediction values for a sub-set of time series, time series in the sub-set of time series comprising time series that are absent loaded recorded data and loaded prediction data in at least one of the one or more gaps in the second time window; and
    adjusting one or more of devices of the system that generate the recorded data based on the prediction values.

2. The method of claim 1, wherein the prediction data are stored as one of statistical distributions and density functions.

3. The method of claim 1, wherein the prediction data are stored as stochastic samples and loading at least a portion of the prediction data includes selecting a random sample of the stochastic samples.

4. The method of claim 1, further comprising:
    if a marginal likelihood of the at least a portion of recorded data and the at least a portion of prediction data is tractable, computing the marginal likelihood; and
    if the marginal likelihood of the at least a portion of recorded data and the at least a portion of prediction data is not tractable, computing a conditional density of the at least a portion of recorded data and the at least a portion of prediction data.

5. The method of claim 1, further comprising computing a conditional probability for each data point of the at least a portion of recorded data within the second time window.

6. The method of claim 1, further comprising:

computing a cost function that includes a conditional density and a computational cost over a range of parameter values; and adjusting at least one parameter of the Bayesian model to correspond to a minimum of the cost function.

7. The method of claim 1, wherein adjusting the one or more devices includes one of or more of performing maintenance on and scheduling maintenance of the one or more devices.

8. The method of claim 1, wherein adjusting the one or more devices includes adjusting operational settings of the one or more devices.

9. A system, comprising:
one or more processors; and
a computer-readable storage device coupled to the one or more processors and having instructions stored thereon which, when executed by the one or more processors, cause the one or more processors to perform operations comprising:
storing recorded data in a data storage as a plurality of time series, each time series having a first recorded value corresponding to a first time and a final recorded value corresponding to an end of the time series;
providing, within a first time window, interpolated values using a Bayesian model, the interpolated values being used for missing values in the plurality of time series;
storing the interpolated values as prediction data in a prediction storage;
loading at least a portion of the recorded data from the data storage, the at least a portion of the recorded data being defined using a second time window;
loading at least a portion of the prediction data from the prediction storage, the at least a portion of the prediction data corresponding to one or more gaps in the second time window;
predicting, using the Bayesian model, prediction values for a sub-set of time series, time series in the sub-set of time series comprising time series that are absent loaded recorded data and loaded prediction data in at least one of the one or more gaps in the second time window; and
adjusting one or more of devices of the system that generate the recorded data based on the prediction values.

10. The system of claim 9, the operations further comprising storing the prediction data as one of statistical distributions and density functions.

11. The system of claim 9, wherein the prediction data are stored as stochastic samples and loading at least a portion of the prediction data includes selecting a random sample of the stochastic samples.

12. The system of claim 9, the operations further comprising:
if a marginal likelihood of the at least a portion of recorded data and the at least a portion of prediction data is tractable, computing the marginal likelihood; and
if the marginal likelihood of the at least a portion of recorded data and the at least a portion of prediction data is not tractable, computing a conditional density of the at least a portion of recorded data and the at least a portion of prediction data.

13. The system of claim 9, the operations further comprising computing a conditional probability for each data point of the at least a portion of recorded data within the second time window.

14. The system of claim 9, the operations further comprising:
computing a cost function that includes a conditional density and a computational cost over a range of parameter values; and
adjusting at least one parameter of the Bayesian model to correspond to a minimum of the cost function.

15. The system of claim 9, the operations further comprising one or more of performing maintenance on and scheduling maintenance of the one or more devices.

16. The system of claim 9, the operations further comprising adjusting operational settings of the one or more devices.

17. Computer-readable storage media coupled to the one or more processors and having instructions stored thereon which, when executed by the one or more processors, cause the one or more processors to perform operations comprising:
storing recorded data in a data storage as a plurality of time series, each time series having a first recorded value corresponding to a first time and a final recorded value corresponding to an end of the time series;
providing, within a first time window, interpolated values using a Bayesian model, the interpolated values being used for missing values in the plurality of time series;
storing the interpolated values as prediction data in a prediction storage;
loading at least a portion of the recorded data from the data storage, the at least a portion of the recorded data being defined using a second time window;
loading at least a portion of the prediction data from the prediction storage, the at least a portion of the prediction data corresponding to one or more gaps in the second time window;
predicting, using the Bayesian model, prediction values for a sub-set of time series, time series in the sub-set of time series comprising time series that are absent loaded recorded data and loaded prediction data in at least one of the one or more gaps in the second time window; and
adjusting one or more of devices of the system that generate the recorded data based on the prediction values.

18. The storage media of claim 17, the operations further comprising storing the prediction data as one of statistical distributions and density functions.

19. The storage media of claim 17, wherein the prediction data are stored as stochastic samples and loading at least a portion of the prediction data includes selecting a random sample of the stochastic samples.

20. The storage media of claim 17, the operations further comprising:
if a marginal likelihood of the at least a portion of recorded data and the at least a portion of prediction data is tractable, computing the marginal likelihood; and
if the marginal likelihood of the at least a portion of recorded data and the at least a portion of prediction data is not tractable, computing a conditional density of the at least a portion of recorded data and the at least a portion of prediction data.

* * * * *